(12) United States Patent
Pearce

(10) Patent No.: X7357
(45) Date of Patent: Dec. 29, 1832

(54) WASHING MACHINE, & DRYING

(76) Inventor: Thomas Pearce

Thomas Peirce Hartwick Otsego Co. New York

The schedule referred to in these Letters Patent and making part
of the same, containing a description in the words of the said
Thomas Peirce himself of his Improvement in the machine for washing
and drying clothes.

---

To all to whom these presents shall come Greeting:
Be it known that I Thomas Peirce of Hartwick in the county of
Otsego and State of New York have invented a machine for washing
and drying clothes and that the following is a full and exact description
of the construction and operation of the said machine as invented
by me. It consists of a box 1 foot and 6 inches in depth and 3 feet
in length with ends inclined 45 degrees so as to meet at the bottom
making the cavity of said box triangular and the width 18 inches.
this box is based on 4 legs or standards 10 inches in height on which it
stands making the height of the box when a cover one inch in thickness
is laid upon it and which is necessary when in use to be 29 inches from
the floor on which it stands - from 2 sides of this box which are perpendic-
-ular arises two standards 11 inches in height &c. above the top of the box and
exactly half the distance from the ends - through these standards 2½ inches
from the top is a hole for an axle which extends across the machine and is sup-
-ported by the standards aforesaid which are situated on each side of the box
at an equal distance from the ends - this axle being 22 inches in length and
either round or square at pleasure is 1½ inch in diameter and constitutes
a bearing for a lever which is 6 feet & 4.... in length and the aforementioned
axle passes through this lever at the centre and forms its bearing or fulcrum.
Through this lever which is supported by the horizontal axle
above mentioned are two mortises one each side of the axle and commence 10 inches
from the axle and end 22 inches from the axle making the mortise 12 inches
in length - Into each of these mortises are put a shaft or arm 2 feet & four
inches in length extending downwards into the box at an inclination of 45 degrees
soso that by raising one end of the lever the other end is correspondingly and neces-
sarily lowered and these arms are fitted with each a foot or perforated board
5½ inches in width 1/4th inch in thickness the holes 3/4 in size and within ½ an
inch over the whole surface of the foot which foot extends quite across the machine
and is exactly similar on each arms the arms are suspended in the said motise
by a wooden pin — and 4 or more holes may be made in the arms to take up
the length of the same or extend it at pleasure. The manner of operating
or using is to seize the lever at either end (which ends are of convenient size
for the hands) and alternately raise and lower the end which by raising the
feet described or perforated board continually changes the position of the —
clothes which with hot water and soap are to be put into the triangular box
and thus operating a few minutes the clothes are cleansed — The dimensions of
the above described machine may be diminished or enlarged as circumstances
may require — The arms above mentioned are curved to prevent the water fol-
-lowing them over the top of the machine — there may be placed at the bottom
of the triangular box on both sides a clect for the purpose of producing friction
by raising the feet as the compression of the clothes increases — In the operation
of the machine upon the clothes is not to roll the clothes in the wash but to
give a direct compression i.e. by first pressing them in one direction against
the end of the box and again in an exact opposite situation to press them
against the other end and that alternately — The arms are to be curved in order
to ray through a smaller place in the cover that no water may escape by the
friction of the arm — On the right side of the above described box is placed
a similar box corresponding in all respects to the one above described; from
the sides arise 2 perpendicular standards to the height of 2 feet and three
inches above the top of the box these standards run downward into the box
on the inside 11 inches quite across the box and on to the standard are fastened
by being let into the standard 0. two pieces of board forming girths on which
is laid platform for the support of another box which is made square and
every side perforated with holes 3/4 inch and ½ inch apart and may be proper-
-ly termed a vat which is for the reception of the clothes from the suds after
cleansing by the wash as above described. the dimensions of this vat or box is 12
inches —

1.

inches in length 12 in height and 12 in width and is situated within the triangular box upon the platform — immediately above this square box is a follower for the purpose of compressing the clothes which are put into this vat to that degree that the suds is altogether forced out of the perforated vat which vat admits of removal; the power applied to the follower is simply a lever power obtained by the use of a gearing similar to that which is employed in ordinary jack screws, 16 by 3 cog wheels working into a stanchion with cogs and turned by a common hand crank. at the top of the two standards which extends from the sides of the box into which the platform for the vat are notched above said platform is placed two pieces of boards 22 inches in length and 12 inches in width across, from one to the other standard in order to receive the cog wheel and crank gudgeons and also to direct the course of the stanchion which operates the follower. the mode of operating is to raise the follower by use of a crank and the cog wheel gearing entirely from the vats and put in the clothes while yet wet then apply the power to the follower until a sufficient degree of compressibility causes the escape of the water through the perforations in the vat and the water so excluded falls into the triangular box and is drawn from the same by a faucet at the bottom.

Witnesses
David Kendall
Emeline L. Kendall

Thomas Peirce.

Exd
W.[illegible]

(1200 words)

Patented 29th December 1832.